United States Patent [19]

Janiga

[11] Patent Number: 4,701,383
[45] Date of Patent: * Oct. 20, 1987

[54] LIGNOSULFONATE-PHENOL-FORMALDEHYDE RESIN BINDER IN SHEET MATERIAL AND METHOD OF MAKING SAID SHEET MATERIAL

[75] Inventor: Eugene R. Janiga, Roselle, Ill.

[73] Assignee: Masonite Corporation, Chicago, Ill.

[*] Notice: The portion of the term of this patent subsequent to Dec. 27, 2000 has been disclaimed.

[21] Appl. No.: 809,216

[22] Filed: Dec. 16, 1985

Related U.S. Application Data

[63] Continuation of Ser. No. 564,236, Dec. 21, 1983, Pat. No. 4,559,097, Continuation-in-part of Ser. No. 427,841, Sep. 29, 1982, Pat. No. 4,423,173.

[51] Int. Cl.$^4$ .............................. B29J 5/02; C09J 3/28
[52] U.S. Cl. .................................... 428/527; 156/335; 428/529; 428/535; 428/536
[58] Field of Search ............. 156/335, 297, 296, 62.2, 156/62.6, 62.8; 428/506, 534, 535, 537, 528, 526, 527, 113, 529; 264/109; 524/14, 595; 527/403

[56] References Cited

U.S. PATENT DOCUMENTS

| | | | |
|---|---|---|---|
| 3,658,638 | 4/1972 | Ludwig et al. | 156/335 |
| 3,790,442 | 2/1974 | Ashall | 527/403 |
| 3,886,101 | 5/1975 | Felicetta et al. | 156/335 |
| 3,940,352 | 2/1976 | Wennerblom et al. | 527/403 |
| 3,956,207 | 5/1976 | Blackmore et al. | 156/335 |
| 4,105,606 | 8/1978 | Forss et al. | 156/335 |

*Primary Examiner*—Michael Ball
*Attorney, Agent, or Firm*—Mason, Kolehmainen, Rathburn & Wyss

[57] ABSTRACT

A method of manufacturing a lignosulfonate-phenol-formaldehyde resin includes heating a mixture of phenol, formaldehyde, lignosulfonate and alkali at a temperature of 60° C. to 100° C. and a pH of 8–13. The lignosulfonate comprises about 5 to about 80 percent of the total weight of phenol, formaldehyde and lignosulfonate and the lignosulfonate is mixed with said phenol and formaldehyde before substantial reaction between said phenol and said formaldehyde. Also disclosed are fibrous articles manufactured using this resin as a binder, such as fiberboards, particle board, plywood, oriented strand board, and waferboard.

5 Claims, No Drawings

LIGNOSULFONATE-PHENOL-FORMALDEHYDE RESIN BINDER IN SHEET MATERIAL AND METHOD OF MAKING SAID SHEET MATERIAL

CROSS REFERENCE TO RELATED APPLICATION

This is a continuation, of application Ser. No. 564,236, filed Dec. 21, 1983, now U.S. Pat. No. 4,559,097 which is a continuation-in-part of my prior application Ser. No. 06/427,841 filed Sept. 29, 1982, now U.S. Pat. No. 4,423,173.

FIELD OF THE INVENTION

The present invention relates to a lignosulfonate modified phenol-formaldehyde resin particularly useful in the formation of man-made boards and molded objects including fibers, fibrous particles and a plurality of uniformly, or randomly shaped pieces, masses or sheets bonded together with the lignosulfonate modified phenol-formaldehyde resin. More particularly, the present invention relates to a method of manufacturing a novel binding resin comprising phenol, formaldehyde, and about 30% to about 60% by weight lignosulfonate added to the phenol and formaldehyde prior to any substantial amount of phenol-formaldehyde polymerization. The present invention also relates to the method of manufacturing fibrous objects, particle objects and objects or sheet materials made by bonding together a plurality of uniformly or randomly shaped masses, for example, fiberboards such as hardboard and insulation board; particle board; plywood; oriented strand board; and waferboard, using this novel resin binder and to the method of manufacturing these articles.

BACKGROUND OF THE INVENTION AND PRIOR ART

Synthetic resin binders, such as phenolformaldehyde, added in the manufacture of fiberboard, such as hardboard and particle board, or used to bond adjacent, e.g. fibrous, material parts such as in the manufacture of plywood, oriented strand board and waferboard, represent a substantial portion of the cost of manufacture. Many attempts have been made to substitute all or a portion of such synthetic resin binders with less expensive components. For example, attempts have been made to utilize lignin-containing spent digestion liquors to form binding resins capable of bonding fibers and fibrous particles in the formation of a fiberboard, as set forth in U.S. Pat. Nos. 2,849,314 and 3,095,392. As set forth in the Guss U.S. Pat. No. 2,849,314, in spite of the many processes proposed for obtaining resinous compositions from sulfite liquor, for the most part such products have found little or no commercial application as thermosetting impregnating agents, binders or adhesives and particularly in the field of production of improved cellulosic and other fibrous materials.

In accordance with the Herrick U.S. Pat. No. 3,095,392, a lignosulfonate is added to a reacted mixture of phenol and formaldehyde to form a modified phenol-formaldehyde resin for use as a fluid loss control agent in drilling muds and portland cement slurries. In accordance with the Herrick method of manufacture of the lignosulfonate modified phenol-formaldehyde resins, the phenol and formaldehyde are permitted to react prior to the addition of the lignosulfonate.

In accordance with the principles of the present invention, it has been found that new and unexpected results are achieved in the formation of a lignosulfonate modified phenol-formaldehyde resin when the lignosulfonate is added to phenol and formaldehyde prior to a significant amount of reaction between the phenol and formaldehyde.

SUMMARY OF THE INVENTION

In brief, the present invention is directed to the manufacture of modified phenol-formaldehyde resins by substituting a portion of the phenol with a lignosulfonate. In accordance with an important feature of the present invention, the lignosulfonate should be in contact with the phenol and formaldehyde at the beginning of the reaction. Since lignosulfonate is a by-product of many pulping processes, it is economically desirable to substitute the lignosulfonate for phenol to provide the lignosulfonate-phenolformaldehyde resin of the present invention.

In accordance with another important feature of the present invention, the lignosulfonate modified phenol-formaldehyde resin of the present invention can be used to bind fibers, fibrous particles, and uniformly or randomly shaped masses in the production of fiberboard and other fibrous articles, such as hardboard; insulation board; fiberglass mats; lamination of sheet materials, such as in the manufacture of plywood; and in bonding together a plurality of discrete, uniformly or randomly shaped members, particularly fibrous members, such as in the manufacture of oriented strand board and waferboard, to provide new and unexpected strength, water resistance and dimensional stability.

Generally, in the manufacture of a phenolformaldehyde resin one mole of phenol is reacted with two moles of formaldehyde. In accordance with the principles of the present invention, five to eighty percent by weight of this phenol can be substituted with a lignosulfonate and the mixture heated to form the lignosulfonate-phenol-formaldehyde resin of the present invention. Heating generally is carried out at a temperature of 60°–100° C. for a period of 1–5 hours to achieve the lignosulfonate-phenol-formaldehyde resin of the present invention. To achieve the full advantage of the present invention, the lignosulfonate should be in contact with the phenol and formaldehyde in mixture prior to the formation of any substantial amount of phenol-formaldehyde polymer so that the lignosulfonate is available for reaction at the beginning of polymerization.

DETAILED DESCRIPTION OF THE PRESENT INVENTION

The lignosulfonate-phenol-formaldehyde resin of the present invention is prepared by mixing a lignosulfonate, phenol and formaldehyde and adding caustic, or some other chemical capable of liberating hydroxyl ions in water, thereby raising the pH to 8-13 to begin the polymerization reaction. To achieve the full advantage of the present invention, the caustic should be added in an amount sufficient to raise the pH of the reactant mixture to a value of about 9–11. The lignosulfonate is added to the reaction mixture prior to any substantial amount of phenol-formaldehyde condensation to achieve unexpected strength, water resistance and dimensional stability when the resin is used as a binder in the manufacture of fibrous articles.

The lignosulfonate may be relatively pure lignosulfonate or may contain a substantial quantity of, up to about 80%, impurities. For example, the lignosulfonate source may be a spent sulfite cooking liquor from the pulping of wood in the composition that the cooking liquor is recovered from the pulping process, or a lignosulfonate composition obtained by concentrating such spent sulfite cooking liquors. Modified lignosulfonates are also useful in forming the resins of the present invention. Such modified lignosulfonate products are unidentified complex polymeric materials derived from the components of spent sulfite liquor, as described in the Steinberg et al U.S. Pat. No. 3,505,243. The major solid component of a spent sulfite liquor is lignosulfonate and the liquor also contains a significant amount of carbohydrates and smaller amounts of waxes, resins and digestion chemicals. The lignosulfonates useful for reaction in manufacture of the lignosulfonate-phenol-formaldehyde resins of the present invention can be obtained from any spent sulfite liquor including sodium, calcium, ammonium, and magnesium based liquors. Further, spent alkaline (black) digestion liquors can be sulfited to provide a lignosulfonate source for polymerization in accordance with the manufacture of the resins of the present invention. While such black liquors usually contain a larger percentage of non-lignin components, any lignosulfonate source having at least about 5% by weight lignosulfonate may be used for reaction, as is, without further concentration for reaction with phenol and formaldehyde in manufacturing the resins of the present invention. Further, when such resins are used as binders in fibrous articles made by the wet process, most of the non-functional impurities from the spent liquor, such as inorganic salts and the like, will be washed out through the mat during formation and any minor amount of impurities which are retained in the mat or sheet generally do not present a manufacturing problem and do not cause deterioration of the physical properties of the fibrous article.

In accordance with the method of the present invention, phenol, formaldehyde, water, and a lignosulfonate source, such as waste sulfite cooking liquor from the pulping process, are charged to a reactor equipped with a stirrer, thermometer, and condenser, and the mixture is warmed to about 45° C. At this point, a base capable of raising the pH of the reactant mixture, for example a caustic such as sodium hydroxide, is added to the mixture in a controlled manner to control the temperature rise to about 1° C. per minute. To achieve the full advantage of the present invention, the condensation is started with little or no alkali in the reaction mixture, and the alkali is added incrementally to control the condensation steadily until the desired degree of polymerization is achieved. After the temperature reaches about 90° C. (after about 45 minutes) the temperature of the reaction mixture is held constant for about 1 to 3 hours to achieve a desired degree of polymerization. The mixture is then cooled and diluted to about 20% solids or less to prevent further polymerization.

In accordance with an important feature of the present invention, the formaldehyde—phenol mole ratio in the reaction mixture should be in the range of 3.6-1.2 and the hydroxyl ion liberator (caustic) to phenol mole ratio in the reaction mixture should be in the range of 1.0-0.2. The amount of lignosulfonate can vary over a wide range of about 5-80% by total weight of phenol, formaldehyde, and lignosulfonate in the reaction mixture.

To achieve the full advantage of the present invention, the percentage by weight of phenol, formaldehyde and lignosulfonate based on the total weight of the reaction mixture should be in the range of 10-70% and the polymerization reaction should be carried out at a temperature in the range of about 60°-100° C.

In accordance with the following example 1 a lignosulfonate-phenol-formaldehyde resin was prepared by substituting 30% of the phenol with a lignosulfonate.

EXAMPLE 1

| 30% LIGNOSULFONATE SUBSTITUTION | | | | |
| --- | --- | --- | --- | --- |
| Percent Solids | Reagent | Moles | Dry Grams | Wet Grams |
| 90 | Phenol | 1.0 | 94.0 | 104.4 |
| 50 | Waste Sulfite Liquor (50% ligno-sulfonate) | | 40.3 | 80.6 |
| 37 | Formaldehyde | 3.0 | 90.0 | 243.2 |
| 50 | Caustic (NaOH) | 0.5 | 20.0 | 40.0 |
| | Water | | | 142.5 |
| | | | 244.3 | 610.7 |

All of the components except the caustic are charged to a reactor equipped with a stirrer, thermometer, and condenser. The components are mixed and warmed to 45° C. At this time, the caustic is added in such a manner as to control the temperature rise to 1° C. per minute. After the temperature reaches 90° C. (about 45 minutes), the temperature is held constant for 2 hours until the viscosity of the resin mixture reaches about 10 to about 1000 centipoises. It has been found that the resins of the present invention generally should have a viscosity in the range of about 100 to about 600 centipoises when used to bind discrete solid particles, such as in the manufacture of plywood, oriented strand board and waferboard. To achieve the full advantage of the present invention for resins manufactured in accordance with the present invention when used in laminating sheet material, or when used to bind discrete solid masses, such as in the manufacture of oriented strand board or particle board, the resins should have a viscosity in the range of about 200 to about 500 centiposes. The mixture is then cooled and diluted to 20 percent solids.

In accordance with an important feature of the present invention, polymerization should be terminated when the reaction mixture reaches a viscosity in the range of about 10 centipoises to about 1000 centipoises when measured at a pH of about 10.3. Resins polymerized in accordance with the present invention to a viscosity in the range of about 10 centipoises to about 1000 centipoises will provide new and unexpected bonding between fibers; fibrous particles; sheet materials, particularly fibrous sheet materials such as wood veneers laminated to manufacture plywood; and masses of uniformly or randomly shaped discrete members such as wood sheet portions or strips bonded in the manufacture of sheet materials such as oriented strand board and waferboard. The lower viscosities, e.g. 10 to 200 centipoises are preferrable for use as binders in initial consolidation of individual fibers or smaller discrete pieces, such as in the initial consolidation of fiber in the manufacture of fiberboard, particle board and insulation board. The higher viscosity resins, e.g. 200 to 1000 centipoises are most appropriate for binding together a plurality of discrete masses or sheet material, such as in the manufacture of plywood, oriented strand board, and waferboard. When the resins of the present invention are used in the wet process to manufacture fiberboard or other water-laid fibrous sheets, e.g. resins having a viscosity of abouit 10 to about 200 centipoises, they will precipitate out of forming water, having a pH of about 5 or less, onto the fibers to provide new and unexpected bonding strength and bonding maintenance as evidenced by the internal bond, modulus of rupture and boil swell data set forth in Tables 1–3.

To achieve the full advantage of the present invention when the resins are used to bond discrete masses, particularly fibrous masses, such as in the manufacture of plywood, oriented strand board and waferboard, polymerization should be terminated when the reaction mixture reaches a viscosity in the range of about 200 centipoises to about 600 centipoises, measured at a pH of 10.3. Resins of the present invention prepared by terminating polymerization at a viscosity of about 10 to about 200 centipoises, and preferably about 20 to about 60 centipoises have provided new and unexpected bonding when used as a binder in the initial formation or consolidation of fibrous products, such as fiberboard, and insulation board.

Polymerization can be terminated in any manner, such as by cooling the reaction mixture to about room temperature and diluting the mixture to about 20% solids, as set forth in Example 1. Dilution to about 10% to about 30% solids slows resin aging by slowing further polymerization to lengthen resin shelf life to at least about 1 month at room temperature.

The resin of example 1 was then compared to a typical phenol-formaldehyde resin in the manufacture of a fiberboard using typical binder incorporation levels of ¾% and 1%. It was found that the fiberboard manufactured with the resin binder of the present invention has new and unexpected physical characteristics of strength, water resistance and dimensional stability as indicated by the test data set forth in Table I.

TABLE I

|  | 30% Lignosulfonatephenol formaldehyde Resin | | 100% Phenol-formaldehyde Resin | |
| --- | --- | --- | --- | --- |
| Resin Level (%) | 1 | ¾ | 1 | ¾ |
| Specific Gravity | .912 | .898 | .926 | .898 |
| One hour-boil swell | 51.1 | 54.0 | 60.9 | 73.1 |
| Internal Bond | 160 | 128 | 101 | 89 |
| Modulus of Rupture (psi) | 4069 | 4002 | 3295 | 3087 |

The above data clearly shows superior properties at a lower rate of resin usage in typical fiberboard manufacture using the lignosulfonate-phenolformaldehyde resin of the present invention compared to a conventional phenol-formaldehyde resin. The lower boil swell and higher internal bond and modulus of rupture are evident at the 25% reduction of resin in the board.

To achieve the unexpected strength, water resistance and dimensional stability using the resins manufactured in accordance with the principles of the present invention in the formation of a fibrous article, either in initial bonding of individual fibers or in bonding discrete solid masses, the lignosulfonate should be reacted with the phenol and formaldehyde prior to any substantial polymerization between the phenol and formaldehyde. The first two rows of data, set forth in Table 2, were obtained from 7/16" fiberboard manufactured using 1% of the resin manufactured in accordance with Example 1 and the data set forth in the last two rows of table 2 was obtained from 7/16" boards manufactured using a resin made by introducing the lignosulfonate after the beginning of polymerization between the phenol and formaldehyde (lignosulfonate addition after 1.75 hours and after 2.25 hours of reaction). The total cook time for each resin is 2.5 hours. It is clear from Table 2 that new and unexpected results, both in terms of the one-hour boil test and the modulus of rupture, are obtained when the lignosulfonate is introduced to the reaction mixture prior to any substantial amount of reaction between the phenol and formaldehyde.

TABLE 2

| Parts Lignosulfonate | Parts Phenol | Parts Resin | Lignosulfonate Intro. | One-Hour Boil (%) | Modulus of Rupture (psi) |
| --- | --- | --- | --- | --- | --- |
| 30 | 70 | 1 | Immediately | 63.8 | 4,862 |
| 50 | 50 | 1 | Immediately | 62.5 | 5,285 |
| 50 | 50 | 1 | After 1.75 hours | 90.8 | 4,297 |
| 50 | 50 | 1 | After 2.25 hours | 85.2 | 4,404 |

The one hour boil test data were collected by boiling a 1×12 inch test sample for one hour, measuring the change in caliper of the sample and expressing the result as a percentage of expansion. The smaller boil values indicate superior performance. The modulus of rupture data were collected in accordance with ASTM-1037 and shows new and unexpected results for the lignosulfonate-phenol-formaldehyde resin manufactured by lignosulfonate addition prior to phenolformaldehyde polymerization.

An easy test can be performed to determine how long the phenol and formaldehyde in caustic, aqueous solution can be heated without formation of the phenol-formaldehyde pre-polymer in order to define, for the purpose of this disclosure, the point at which it is too late to add the lignosulfonate to achieve the new and unexpected results of the present invention. Phenol and formaldehyde is cooked in a caustic, aqueous solution for a given length of time and the pH then lowered to less than 5. If an emulsion does not occur when the pH is lowered below 5.0, then the mixture is only composed of starting materials and/or oligomers. If an emulsion begins to form, the polymerization has just begun.

In accordance with an important feature of the present invention, the lignosulfonate can be added to the phenol, formaldehyde, caustic aqueous mixture at any point in time up to, and including, the formation of an emulsion when the pH of the reaction mixture (without lignosulfonate) is lowered to less than 5. Further heating past this point (emulsion or less, as defined by the above test) leads to a polymer having a measurable viscosity at 40% solids i.e. measureable with Gardner bubble tubes.

The data set forth in Table 3 shows the superiority of the resins manufactured in accordance with the present invention when the lignosulfonate is added prior to phenol-formaldehyde polymerization, as compared to resins manufactured when the lignosulfonate is added after the beginning of polymerization.

TABLE 3

| Degree of Pre-polymer | Substantially No Polymerization: Emulsion or Less | | | | Some Polymerization: Gardner Bubble Tube Capable of measuring Viscosity | | |
| --- | --- | --- | --- | --- | --- | --- | --- |
| Pre-polymer | Emulsion | Emulsion | None | Emulsion | A/B | A-1 | A-1 |
| Phenol-formaldehyde Ratio | 2.2 | 2.2 | 3.0 | 2.2 | 2.2 | 2.2 | 2.2 |
| Caust-Phenol Ratio | 0.32 | 0.32 | 0.52 | 0.32 | 0.32 | 0.32 | 0.32 |
| Total Cooking Time (hours) | 2.0 | 1.8 | 1.5 | 1.8 | 2.0 | 2.5 | 2.5 |
| % Lignosulfonate Substitution | 30 | 40 | 40 | 50 | 30 | 40 | 50 |
| Test Results: | | | | | | | |
| One-Hour Boil (%) | 57.1 | 56.7 | 56.4 | 64.3 | 61.2 | 72.1 | 90.8 |
| Moduls of Rupture (psi) | 5341 | 4,569 | 5,101 | 4,936 | 4,840 | 4,159 | 4,297 |

BONDING OF A PLURALITY OF DISCRETE MASSES, PARTICULARLY, FIBROUS MASSES, SUCH AS IN THE MANUFACTURE OF LAMINATES, E.G. PLYWOOD ORIENTED STRAND BOARD AND WAFERBOARD

The lignosulfonate-phenol-formaldehyde resins of the present invention generally are useful as binders in any environment where phenol formaldehyde binding resins have been used. Examples of such uses include the manufacture of laminates, such as in the manufacture of plywood, and in the bonding together of discrete uniformly or randomly shaped members, particularly fibrous members, such as in the manufacture of chip board, particle board, oriented strand board and waferboard. In the manufacture of such products, the binding resin is disposed between closely adjacent discrete pieces, particles or members to securely bond the discrete particles or members by sandwiching a layer or area of binder between the two closely adjacent particles or members. Some products, such as chip board, particle board and oriented strand board are manufactured by completely coating the discrete particles or members to be adhered together with a layer of wet, viscous, i.e. 300 cps, resin binder and pressing or molding the members into a desired shape under heat and pressure to cure the binder while pressing the adjacent particles or members into close contact.

In the manufacture of waferboard, the binder is used in a dry or powder form sporatically over the wafers or fibrous pieces, instead of providing a complete coating to provide distinct areas of bonding between closely adjacent members, similar to spot welds in metal. The manufacture of fibrous sheet materials from smaller fibrous portions such as chip board, particle board, oriented strand board and waferboard is becoming increasingly important with the dwindling supply of trees suitable for peeling into continuous sheets, e.g. wood veneer as used in making plywood. The resins of the present invention are useful in the same manner and generally in the same amounts as phenol formaldehyde binding resins in manufacturing sheet materials such as particle board, oriented strand board, waferboard, and plywood as well as in binding together individual fibers as in the manufacture of fiberboards such as hardboard and insulation board (wet and dry process); fiberglass woven and non-woven mats and the like.

PLYWOOD MANUFACTURE

Plywood is manufactured by peeling a tree into a long veneer, for example Southern Pine or Douglas fir, cutting the veneer to a given dimension, i.e. 4 ft by 8 ft, and laminating a plurality of the cut veneers, under pressure, with one or more intermediate layers of a binder, e.g. a phenol formaldehyde glue formulation. The adjacent veneers of plywood are oriented so that the fiber grain direction of alternate veneers are at right angles when laminated together. The glue formulation, including a resin having a viscosity of about 300 centipoise is spread between adjacent plywood veneers at a rate of about 20 grams/ft$^2$ where the glue formulation includes about one third by weight resin and the remainder comprises water, extenders, fillers and the like to achieve a suitable glue formulation. Industry standards require plywood to achieve a value of at least 80 when tested for lap shear, measured as a percent wood failure.

To show that the resins of the present invention are suitable for plywood manufacture, twelve plywood samples of three ply construction were made using the resin of Example 1 in the glue formulation shown in Table 4:

TABLE 4

| GLUE FORMULATION | |
| --- | --- |
| Resin of Example 1 (41% solids) | 88.2 grams |
| Wheat flour (filler) | 12.2 grams |
| H$_2$O | 10.8 grams |
| Ground Corn Cob (extender) | 19.1 grams |
| Resin of Example 1 (41% solids) | 114.6 grams |

The glue components are mixed in the listed order. The resin of Example 1 first is mixed with the wheat flour, then water is added and mixed followed by addition of the corn cob extender and a final mixing of additional resin for most convenient and homogeneous mixing. The viscosity of the resin in the glue formation is 300 centipoises. Twelve three ply plywood samples then are manufactured using southern pine veneers having a moisture content of 7% by weight and a glue spread rate of 20 grams/ft$^2$ at each interface. The twelve plywood samples each have dimensions of 12 inches × 12 inches × ½ inch. The center veneer of each sample is oriented so that its fiber grain direction is perpendicular to the fiber grain direction of the upper and lower face veneers. The three plys are laminated in a platen press at a temperature of 300° F. and a pressure of 225 psig for 8 minutes. The data of Table 5 show that all twelve plywood samples laminated using the glue formulation of Table 4 met or exceeded the industry standard for lap shear tested both dry and wet:

TABLE 5

3 PLY PLYWOOD MADE WITH GLUE FORMULATION OF TABLE 4 - RESIN VISCOSITY OF 300 cps; 20 gms/ft² At Each Interface

| Test | Industry Standard | Range | Avg. | No. of Samples |
|---|---|---|---|---|
| Lap shear (dry) % wood failure | 80 | 85–90 | 87 | 3 |
| Lap shear (dry) psig | — | 250–334 | 298 | 3 |
| Lap shear (wet)* % wood failure | 80 | 80–90 | 85 | 3 |
| Lap shear (wet)* psig | — | 198–326 | 244 | 3 |

*samples boiled for one hour, then dried to 8% by weight moisture

ORIENTED STRAND BOARD (OSB) MANUFACTURE

Oriented strand board (OSB) is manufactured from a plurality of discrete generally oriented strands or strips of wood hot pressed together using a binder, such as a phenol formaldehyde resin. The pieces or strips of wood are, for example, plywood or veneer strips having a width of about ¼ inch to ⅜ inch, a length of about 2½ inches to about 3 inches and a thickness of about 20 mils. The strips of wood are coated, such as by spraying, with a liquid resin glue and generally oriented so that the fiber direction is approximately the same. The resin coated, oriented strips are disposed into a press or mold so that the strips are in contact with other strips both vertically and horizontally so that when pressed, under heat and pressure, the strips are compressed tightly against other contacting strips to adhere the strips togehter and to mold a sheet of material having desired dimensions. The strands or strips of wood material are not perfectly aligned in one fiber direction (approximately ±20° from a single direction) so that some strips overlap other adjacent strips for stronger adhesion.

Oriented strand board is manufactured having the fibers generally oriented in a length or machine direction or manufactured having the fibers generally oriented in the width or cross-machine direction. Other oriented strand boards are manufactured having a central or core layer including about 50% by weight of the fibers generally oriented in a width or cross-machine direction and having upper and lower layers (each about 25% by weight of total board fibers) generally oriented in a length or machine direction. The resin coated strands having fibers generally aligned in a single direction or having multiple layers of resin coated strands where adjacent layers have fibers aligned generally at a right angle, are hot pressed to form a sheet of predetermined dimensions. Industry standards require that oriented strand boards achieve given values for modulus of rupture (both parallel to and perpendicular to orientation); modulus of elasticity (both parallel to and perpendicular to orientation); and internal bond.

To show that the resins of the present invention are suitable for oriented strand board (OSB) manufacture, thirteen OSB samples were made using the resin of Example 1 (at 48% solids), polymerized to have a viscosity of about 300 cps., as the resin binder. The samples were constructed in three layers having a core comprising about 50% by weight of total fiber oriented in the width or cross-machine direction and having two face layers each comprising about 25% by weight of total fiber oriented in the length or machine direction. The fiber strips are Aspen veneer strips having dimensions of about ¼"×2"×0.020" and having a moisture content of 7% by weight. The resin of Example 1 is sprayed onto the strips in an amount of 6% by weight of fibers. The oriented, resin coated strands were pressed in a platen press at 375° F. and 1400 psig for 3 minutes and the pressure reduced to 120 psig to finish the total pressing time of 7 minutes. The samples have a finished density of 42 pounds/ft³. The samples prepared have dimensions of 18 inches×18 inches×½ inch.

The data of Table 6 demonstrates that the OSB samples manufactured as above and tested generally exceed the industry standards.

TABLE 6

ORIENTED STRAND BOARD

| Test | Industry Standard | Range | Avg. | No. of Samples |
|---|---|---|---|---|
| Modulus of Rupture to orientation | 3500 | 4948–5215 | 5082 | 2 |
| Modulus of Rupture to orientation | 5000 | 6310–8122 | 7216 | 2 |
| Modules of Elasticity to orientation | 400 × 10³ | 395,506–498,081 | 447 × 10³ | 2 |
| Modulus of Elasticity to orientation | 800 × 10³ | 815,141–834,303 | 825 × 10³ | 2 |
| Internal bond (psig) | 80 | 76–91 | 85 | 5 |

WAFERBOARD MANUFACTURE

Waferboard construction is similar to oriented strand board construction in that a number of discrete fibrous pieces or members, having a thickness of about 20 mils, are adhered together under heat and pressure to form a sheet material having predetermined dimensions. Waferboard, however, is manufactured using wood portions (wafers) having approximately square dimensions (e.g. 2 inch to 2.5 inch squares). No attempt is made to orient the fiber direction when making waferboard. Further, the resin binder (e.g. phenol formaldehyde) is applied in a dry powder form since attempts to completely cover the wafers with a liquid resin have not been effective or have resulted in wafer breakage. Generally, the powdered resin is adhered to the fibrous wafer pieces by first wetting the wafers, such as with a liquid sizing agent, and then contacting the wafers with the dry resin to apply resin discontinuously at a plurality of surface areas on each wafer. When the wafers are hot pressed together, the points or areas of resin adherence act similarly to spot welds to strongly adhere the wafers together and form a sheet material having predetermined dimensions. Industry standards require that waferboard have an internal bond of at least 70 psig; a modulus of rupture of at least 500 psig and a modulus of elasticity of at least 800,000.

To show that the resins of the present invention are suitable for waferboard manufacture, fourteen waferboard samples were made using the resin of Example 1, polymerized to a viscosity of about 300 cps., and spray dried to a powder. The liquid resin of Example 1 polymerized to a viscosity of 300 cps. contained 6% moisture after spray drying. The wafers are Aspen wood and are randomly disposed in a press after an initial coating with 2% by weight liquid sizing agent (Petrolatum) and the powdered resin of Example 1 applied at a rate of 2.5% by weight of fibrous wafers. The waferboard samples constructed each have dimensions of 18 inches×18 inches×7/16 inches, and a density of 40 pounds/ft$^3$. The samples were pressed in a platen press at a temperature of 400° F. and a pressure of 500 psig for seven minutes.

The data of Table 7 demonstrates that the waferboard samples manufactured as above, and tested generally meet or exceed the industry standards.

TABLE 7

WAFERBOARD - 40#/ft.$^3$
USING SPRAY DRIED RESIN OF EXAMPLE 1

| Test | Industry Standard | Range | Avg. | No. of Samples |
|---|---|---|---|---|
| Modulus of Rupture | 5,000 | 4105–5455 | 5060 | 3 |
| Modules of Elasticity | 800,000 | 484,814–917,985 | 798,057 | 3 |
| Internal bond (psig) | 70 | 65–89 | 74 | 8 |

To achieve the full advantage of the present invention the resins, when used in liquid form in a binding formulation to adhere together discrete smaller objects, generally are reacted to an extent to achieve a resin having a viscosity in the range of about 200 to about 500 centipoises. To achieve the fullest advantage of the present invention, the resin binder formulation should have a viscosity in the range of about 250 centipoises to about 400 centipoises, when used to bind together discrete solid masses, such as in the manufacture of plywood oriented strand board and waferboard.

I claim:

1. A plywood article manufactured by applying a binder comprising a polymer between two layers of wood and pressing said wood layers together under conditions sufficient to adhere said layers together, the improvement comprising said polymer wherein said polymer is formed by heating a mixture of phenol, formaldehyde, and a lignosulfonate consisting essentially of the lignosulfonates in a waste sulfite or sulfited cooking liquor as recovered from a pulping process under alkaline conditions, said lignosulfonate being added to said phenol and formaldehyde before a substantial amount of reaction between said phenol and said formaldehyde and reacting said mixture to form said polymer.

2. An oriented strand board manufactured by at least partially coating a plurality of wood fiber strand members with a polymeric binder; disposing said coated strand members in contact with at least one other of said strand members; and pressing said wood fiber strand members to adhere said strand members together; the improvement comprising said polymeric binder wherein said polymer is formed by a mixture of phenol, formaldehyde, and a lignosulfonate consisting essentially of the lignosulfonates in a waste sulfite or sulfited cooking liquor as recovered from a pulping process under alkaline conditions, said lignosulfonate being added to said phenol and formaldehyde before a substantial amount of reaction between said phenol and said formaldehyde and reacting said mixture to form said polymer.

3. A waferboard manufactured by binding together a plurality of discrete, relatively thin wood pieces with a polymer binder under pressure sufficient to adhere said wood pieces together into sheet form, the improvement comprising the polymer binder wherein said polymer is formed by a mixture of phenol, formaldehyde, and a lignosulfonate consisting essentially of the lignosulfonates in a waste sulfite or sulfited cooking liquor as recovered from a pulping process under alkaline conditions, said lignosulfonate being added to said phenol and formaldehyde before a substantial amount of reaction between said phenol and said formaldehyde and reacting said mixture to form said polymer.

4. A method of manufacturing a sheet material formed from a plurality of discrete wood pieces adhered together, including contacting a plurality of discrete sheet material members with a binding resin; disposing each of said sheet material members in contact with at least one other of said sheet material members and pressing said sheet material members together with sufficient heat and pressure to form a sheet material, the improvement comprising said binding resin, wherein said resin is formed by mixing a lignosulfonate consisting essentially of the lignosulfonates in a waste sulfite or sulfited cooking liquor as recovered from a pulping process, phenol, formaldehyde and an alkali to form a reaction mixture and heating said mixture to polymerize said mixture, said lignosulfonate being added to said reaction mixture before a substantial amount of reaction between said phenol and said formaldehyde.

5. A method of manufacturing a sheet material formed from a plurality of discrete resin bound fiberglass pieces adhered together, including contacting a plurality of discrete sheet material members with a binding resin; disposing each of said sheet material members in contact with at least one other of said sheet material members and pressing said sheet material members together with sufficient heat and pressure to form a sheet material, the improvement comprising said binding resin, wherein said resin is formed by mixing a lignosulfonate consisting essentially of the lignosulfonates in a waste sulfite or sulfited cooking liquor as recovered from a pulping process, phenol, formaldehyde and an alkali to form a reaction mixture and heating said mixture to polymerize said mixture, said lignosulfonate being added to said reaction mixture before a substantial amount of reaction between said phenol and said formaldehyde.

* * * * *